US010418622B2

(12) United States Patent
Koch et al.

(10) Patent No.: US 10,418,622 B2
(45) Date of Patent: Sep. 17, 2019

(54) BATTERY STATE ESTIMATION CONTROL LOGIC AND ARCHITECTURES FOR ELECTRIC STORAGE SYSTEMS

(71) Applicant: GM Global Technology Operations LLC, Detroit, MI (US)

(72) Inventors: Brian J. Koch, Berkley, MI (US); Charles W. Wampler, Birmingham, MI (US); Mark W. Verbrugge, Troy, MI (US); Daniel R. Baker, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 15/794,049

(22) Filed: Oct. 26, 2017

(65) Prior Publication Data
US 2019/0126770 A1 May 2, 2019

(51) Int. Cl.
*H02J 7/00* (2006.01)
*B60L 11/00* (2006.01)
(Continued)

(52) U.S. Cl.
CPC ........... *H01M 4/13* (2013.01); *B60L 11/1861* (2013.01); *H01M 2/1077* (2013.01);
(Continued)

(58) Field of Classification Search
CPC .......... H02J 7/00; H01M 4/13; H01M 2/1077; H01M 10/425; H01M 10/44; H01M 10/48; B60L 11/1861
(Continued)

(56) References Cited

U.S. PATENT DOCUMENTS 6,103,075 A * 8/2000 Winsel ................ G01N 27/302
204/252
6,639,385 B2 10/2003 Verbrugge et al.
(Continued)

OTHER PUBLICATIONS

"Cell Chemistries—How Batteries Work", https://www.mpoweruk.com/chemistries.htm, Woodbank Communications Ltd, 2005, 8 pages. (Year: 2005).*
(Continued)

*Primary Examiner* — Phallaka Kik
(74) *Attorney, Agent, or Firm* — Quinn IP Law (57) ABSTRACT

Disclosed are battery management systems with control logic for battery state estimation (BSE), methods for making/using/assembling a battery cell with a reference electrode, and electric drive vehicles equipped with a traction battery pack and BSE capabilities. In an example, a battery cell assembly includes a battery housing with an electrolyte composition stored within the battery housing. The electrolyte composition transports ions between working electrodes. A first working (anode) electrode is attached to the battery housing in electrochemical contact with the electrolyte composition. Likewise, a second working (cathode) electrode is attached to the battery housing in electrochemical contact with the electrolyte composition. A reference electrode is interposed between the first and second working electrodes, placed in electrochemical contact with the electrolyte composition. The reference electrode and one or both working electrodes cooperate to output a half-cell voltage signal that is indicative of a battery state of the battery cell assembly.

20 Claims, 3 Drawing Sheets

(51) Int. Cl.
- *H01M 4/13* (2010.01)
- *H01M 2/00* (2006.01)
- *H01M 10/00* (2006.01)
- *B60L 11/18* (2006.01)
- *H01M 2/10* (2006.01)
- *H01M 10/42* (2006.01)
- *H01M 10/44* (2006.01)
- *H01M 10/48* (2006.01)

(52) U.S. Cl.
CPC ......... *H01M 10/425* (2013.01); *H01M 10/44* (2013.01); *H01M 10/48* (2013.01); *H02J 7/00* (2013.01)

(58) Field of Classification Search
USPC .............. 320/104, 109, 110, 112, 114, 161
See application file for complete search history.

(56) References Cited

U.S. PATENT DOCUMENTS

| | | | |
|---|---|---|---|
| 7,109,685 B2 | 9/2006 | Tate, Jr. et al. | |
| 7,324,902 B2 | 1/2008 | Verbrugge et al. | |
| 7,373,264 B2 | 5/2008 | Verbrugge et al. | |
| 7,612,532 B2 | 11/2009 | Verbrugge | |
| 7,768,233 B2 | 8/2010 | Lin et al. | |
| 7,928,690 B2 | 4/2011 | Koch et al. | |
| 8,054,046 B2 | 11/2011 | Lin et al. | |
| 8,108,160 B2 | 1/2012 | Liu et al. | |
| 8,170,818 B2 | 5/2012 | Lin et al. | |
| 8,198,864 B2 | 6/2012 | Koch et al. | |
| 8,212,519 B2 | 7/2012 | Koch et al. | |
| 8,321,164 B2 | 11/2012 | Liu et al. | |
| 8,581,543 B2 | 11/2013 | Koch et al. | |
| 8,645,088 B2 | 2/2014 | Schaefer et al. | |
| 8,836,280 B2 | 9/2014 | Koch et al. | |
| 9,172,118 B2 | 10/2015 | Marsh et al. | |
| 9,176,194 B2 | 11/2015 | Meisner et al. | |
| 9,337,484 B2 | 5/2016 | Verbrugge et al. | |
| 9,354,277 B2 | 5/2016 | Lin et al. | |
| 9,461,490 B2 | 10/2016 | Ying | |
| 9,513,338 B2 | 12/2016 | Koch et al. | |
| 2011/0309838 A1 | 12/2011 | Lin et al. | |
| 2014/0297084 A1 | 10/2014 | Meisner et al. | |
| 2015/0301116 A1 | 10/2015 | Baker et al. | |
| 2015/0318502 A1* | 11/2015 | Kanai | H01L 51/052 257/40 |
| 2016/0039419 A1 | 2/2016 | Wampler et al. | |
| 2016/0077160 A1 | 3/2016 | Wampler, II et al. | |
| 2016/0254562 A1* | 9/2016 | Morris-Cohen | H01M 8/188 320/128 |
| 2016/0259011 A1* | 9/2016 | Joe | H01M 10/48 |
| 2016/0293991 A1* | 10/2016 | Goeltz | H01M 8/04552 |
| 2016/0372777 A1* | 12/2016 | Buckley | H01M 8/188 |
| 2017/0077507 A1* | 3/2017 | Harada | B60L 58/21 |
| 2018/0375132 A1* | 12/2018 | Li | H01M 8/04544 |
| 2019/0157710 A1* | 5/2019 | Makino | H01M 10/056 |

OTHER PUBLICATIONS

Marcicki, "Modeling, Parametrization, and Diagnostics for Lithium-Ion Batteries with Automotive Applications", Ohio State University, 2012, 272 pages. (Year: 2012).*

Young et al., "Chapter 2: Electric Vehicle Battery Technologies", http://www.springer.com/978-1-4614-0133-9, 2013, 43 pages. Year: 2013).*

Zhang et al., "A Generalized SOC-OCV Model for Lithium-Ion Batteries and the SOC Estimation for LNMCO Battery", Energies, 2016, www.mdpi.com/journal/energies, 2016, 16 pages. (Year: 2016).*

Daniel R. Baker, Mark W. Verbrugge, and Xu Xian Hou, A Simple Formula Describing Impedance Artifacts due to the Size and Surface Resistance of a Reference-ElectrodeWire in a Thin-Film Cell, Journal of the Electrochemical Society, Jan. 6, 2017, pp. A407-A417, Chemical and Material Systems Lab, General Motors Research and Development Center, Warren, Michigan 48090, USA.

* cited by examiner

BATTERY STATE ESTIMATION CONTROL LOGIC AND ARCHITECTURES FOR ELECTRIC STORAGE SYSTEMS

INTRODUCTION

The present disclosure relates generally to electric storage systems employing rechargeable batteries. More specifically, aspects of this disclosure relate to systems, methods, and devices for estimating battery state, such as state of charge (SOC) or state of power (SOP), in electric drive vehicles.

Current production motor vehicles, such as the modern-day automobile, are originally equipped with a powertrain that operates to propel the vehicle and power the onboard vehicle electronics. In automotive applications, for example, the vehicle powertrain is generally comprised of a prime mover that delivers driving power through a multi-speed power transmission to the vehicle's final drive system (e.g., differential, axle, and road wheels). Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full-electric vehicles, on the other hand, utilize alternative power sources to propel the vehicle, minimizing or eliminating reliance on a fossil-fuel based engine for power and, thus, increasing the vehicle's overall fuel economy.

Hybrid vehicles employ multiple traction power sources, such as an ICE assembly operating in conjunction with a battery-powered or fuel-cell-powered electric motor, to propel the vehicle. A hybrid electric vehicle (HEV), for example, stores both electrical energy and chemical energy, and converts the same into mechanical power to propel the vehicle and power the vehicle's assorted systems. The HEV is generally equipped with one or more electric machines (E-machine), such as large tractive motor/generators, that operate individually or in concert with an internal combustion engine to propel the vehicle. Some HEV powertrains utilize a fuel cell stack to supply the electric power for powering the traction motors. Since hybrid vehicles are designed to derive their power from sources other than the engine, engines in HEVs may be turned off, in whole or in part, while the vehicle is propelled by the alternative power source(s).

Hybrid vehicle designs vary from platform to platform in how energy storage is allocated between the battery and the combustion engine (and its fuel system) or fuel cell, and how power flows to and from the various sources. The vehicle is also intermediated by electrical or mechanical transmission elements, including series-hybrid and parallel-hybrid powertrains, and whether the battery can be separately charged at a charging station. Accordingly, a variety of terms have been coined to describe such vehicles, such as hybrid electric vehicle (HEV), mild hybrid electric vehicle, strong-hybrid electric vehicle, plug-in hybrid-electric vehicle (PHEV), battery electric vehicle (BEV), extended-range electric vehicle (EREV), and full-electric vehicle (EV). The general abbreviation "xEV" may be employed herein to encompass all of these possibilities, unless explicitly demarcated or disclaimed.

An important parameter in the operation of electric drive vehicles that utilize batteries is the "state of charge" (SOC), which relates to the stored energy in a battery that is available for use at a given time relative to the stored energy that is available when the battery is fully charged. An available approach for SOC estimation is to relate either a measured or a calculated open circuit voltage to the state of charge. This is feasible because open circuit voltage—the resting voltage of the battery when no load is applied—generally exhibits an observable dependence on the battery's state of charge. Available battery types, including some nickel metal hydride (NiMH) and lithium ion (Li-ion) batteries, however, may possess a nearly constant open circuit voltage across most of the range of state of charge. Consequently, measured and calculated open circuit voltage will not provide battery state of charge estimation. An alternative, current-based technique for determining battery SOC is to monitor the current that is flowing into (charging) and leaving (discharging) a battery over time to determine the remaining capacity in the battery; this method is called "coulomb counting."

SUMMARY

Disclosed herein are battery management systems with attendant control logic for battery state estimation, methods for making and methods for operating such battery management systems, and electric drive vehicles equipped with a traction battery pack and controller-based battery state estimation capabilities. By way of example, there is presented a novel battery state estimation (BSE) device and algorithm that uses a reference electrode to help eliminate uncertainty that may be introduced by hysteresis in one half-cell of a battery cell assembly, particularly for systems employing silicon-based battery cells. Battery cells with anodes that contain silicon may exhibit significant hysteresis in the open circuit voltage (OCV), which may introduce a large uncertainty in the relationship between full-cell voltage signal and the battery's state of charge (SOC) and state of power (SOP). By measuring the voltage of the cathode half-cell using the foregoing reference electrode, voltage-based battery state estimation is restored while supporting current-based state estimation. In this unique arrangement, thin layers of material, including a gold contact and lead, an iron(III) phosphate ($FePO_4$) or lithium iron phosphate ($LiFePO_4$) active material tip, and an alumina stabilizer, are deposited on an electrically insulating, porous separator sheet. The separator sheet is then inserted into the battery cell stack, placed between the anode and cathode with the lead in contact with the electrolyte membrane. The thin-layer construction may be packaged in a commercial pouch cell, e.g., for improved corrosion resistance and cycle stability, as well as in cylindrical and prismatic cell constructions.

Attendant benefits for at least some of the disclosed concepts include half-cell, voltage-based battery state estimation that overcomes problems associated with hysteresis in open-circuit voltage, e.g., of silicon-based anodes. Disclosed battery management system designs offer direct measurement of the half-cell voltage, which helps to enhance fast-charge capability by providing a clearer indication of the conditions where lithium plating can initiate. Manufacture of disclosed battery cell devices with reference electrodes is compatible with available battery cell production methods and, thus, does not require additional tooling or costly equipment modifications. Another potential benefit is the ability to make better use of the full-mileage range of batteries for xEV applications that depend on silicon-based anodes for high-energy density.

Aspects of this disclosure are directed to battery management systems with attendant control logic for battery state estimation of one or more battery assemblies. For instance, there is presented a battery cell assembly that is operable to receive, store and supply electrical energy. The battery cell assembly includes a battery housing, which may be in the nature of a can, prism or pouch. An electrolyte composition, which may be in the nature of organic lithium salt, such as LiPF6, is stored within the battery housing. This electrolyte composition conducts positive ions between electrodes of the battery assembly. For instance, a first (anode or negative) working electrode is enclosed within or otherwise operatively attached to the battery housing, placed in electrochemical contact with the electrolyte composition. Likewise, a second (cathode or positive) working electrode is enclosed within or otherwise operatively attached to the battery housing, placed in electrochemical contact with the electrolyte composition. A reference electrode is interposed between the first and second working electrodes, disposed in direct electrochemical contact with the electrolyte composition. The reference electrode cooperates with one or both working electrodes to output a half-cell voltage signal that is indicative of a battery state of the battery cell assembly.

Other aspects of the present disclosure are directed to motor vehicles equipped with a traction battery pack and controller-based battery state estimation capabilities. As used herein, the term "motor vehicle" may include any relevant vehicle platform, such as passenger vehicles (hybrid electric, full electric, fuel cell, fully or partially autonomous, etc.), commercial vehicles, industrial vehicles, tracked vehicles, off-road and all-terrain vehicles (ATV), farm equipment, boats, airplanes, etc. An electric drive motor vehicle is presented that includes a vehicle body with multiple road wheels rotatably attached to the body. A single or multiple traction motors are attached to the vehicle body, and operable, e.g., singly, collectively or in conjunction with an engine assembly, to drive one or more of the road wheels. A traction battery pack, which is anchored to the vehicle body, is electrically connected to the traction motor to transfer electric current therebetween.

Continuing with the above example, the electric drive vehicle's traction battery pack includes an array of battery cell assemblies. Each battery cell is composed of a battery housing with an electrolyte composition stored within the battery housing. A first (anode) working electrode is stored within the battery housing, placed in electrochemical contact with the electrolyte composition. Likewise, a second (cathode) working electrode is stored within the battery housing, placed in electrochemical contact with the electrolyte composition. A reference electrode is interposed between the two working electrodes, placed in direct electrochemical contact with the electrolyte composition. A vehicle controller, which may be resident to or remote from the vehicle body, is communicatively connected to the traction battery pack. The vehicle controller is operable to: receive a half-cell voltage signal from the reference and one or both working electrodes; and determine a battery state of one or more or all of the battery cell assemblies from the half-cell voltage signal.

Additional aspects of this disclosure are directed to methods for making and methods for using any of the herein depicted or described battery cell assembly, pack, and system architectures. For instance, a method is presented for assembling a rechargeable battery cell assembly for receiving, storing, and supplying electrical energy. The representative method includes, in any order and in any combination with any of the disclosed features and options: receiving a battery housing; disposing an electrolyte composition within the battery housing, the electrolyte composition being configured to conduct positive ions; operatively attaching a first working electrode within the battery housing in electrochemical contact with the electrolyte composition; operatively attaching a second working electrode within the battery housing in electrochemical contact with the electrolyte composition; and positioning a reference electrode between the first and second working electrodes such that the reference electrode is in electrochemical contact with the electrolyte composition, wherein the reference electrode and a working electrode cooperate to output a half-cell voltage signal indicative of a battery state of the battery cell assembly.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., may be with respect to a motor vehicle, such as a forward driving direction of a motor vehicle when the vehicle is operatively oriented on a normal driving surface, for example.

Figure 1:
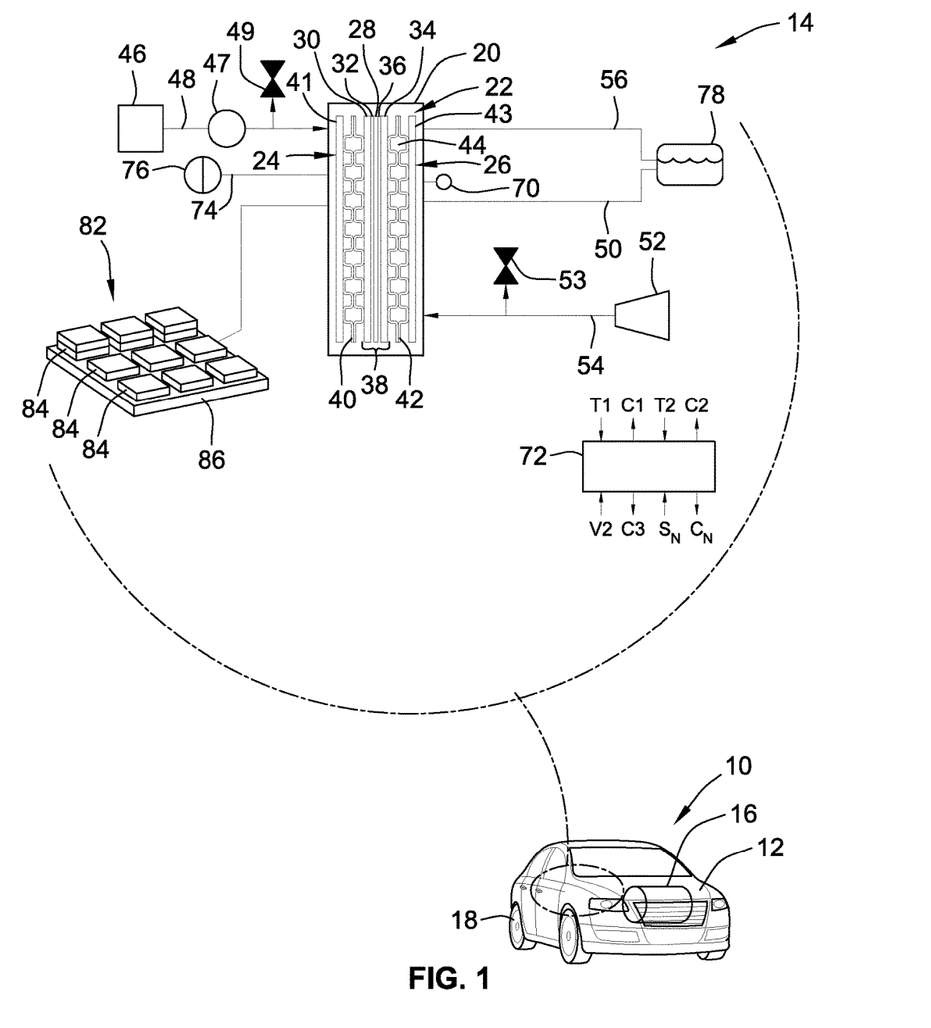
FIG. 1 is a front perspective-view illustration of a representative motor vehicle with an inset view schematically illustrating a representative electric power system with battery state estimation control logic in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as a four-door sedan-style passenger vehicle. Packaged within the vehicle body 12 of automobile 10 is a representative fuel cell system, designated generally at 14, for powering one or more traction motors 16 operable for driving the vehicle's road wheels 18. The illustrated automobile 10—also referred to herein as "motor vehicle" or "vehicle" for short—is merely an exemplary application with which aspects and features of this disclosure may be practiced. In the same vein, implementation of the present concepts into a fuel cell system 14 should also be appreciated as an exemplary application of the novel concepts disclosed herein. As such, it will be understood that aspects and features of the present disclosure may be applied to other electric drive traction systems, implemented for any logically relevant type of motor vehicle, both hybrid and full electric, and utilized for both automotive and non-automotive applications alike. Lastly, the drawings presented herein are not necessarily to scale and are provided purely for instructional purposes. Thus, the specific and relative dimensions shown in the drawings are not to be construed as limiting.

Proton exchange membrane fuel cell system 14 of FIG. 1 is equipped with one or more fuel cell stacks 20, each of which is composed of multiple fuel cells 22 of the PEM type (or "PEMFC") that are mounted, e.g., in series, to one another. In the illustrated architecture, each fuel cell 22 is assembled as a multi-layer construction with an anode side 24 and a cathode side 26 that are separated by a proton-conductive perfluorosulfonic acid membrane 28 (also referred to herein as "electrolyte membrane"). An anode diffusion media layer 30 is located on the anode side 24 of the PEMFC 22, with an anode catalyst layer 32 interposed between and operatively connecting the membrane 28 and corresponding diffusion media layer 30. Likewise, a cathode diffusion media layer 34 is located on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, an MEA 38.

The diffusion media layers 30 and 34 are porous constructions that provide for fluid inlet transport to and fluid exhaust transport from the MEA 38. An anode flow field plate (or "bipolar plate") 40 is provided on the anode side 24 in abutting relation to the anode diffusion media layer 30. In the same vein, a cathode flow field plate (or "bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds (not visible in the view provided) direct hydrogen-based fuel and oxidant to passages in the anode and cathode flow field plates 40, 42. The MEA 38 and bipolar plate 40, 42 may be stacked together between stainless steel clamping plates 41 and 43 and monopolar end plates (not shown). These clamping plates 41, 43 may be electrically insulated from the end plates by a gasket or dielectric coating (not shown).

Hydrogen ($H_2$) inlet flow—be it gaseous, concentrated, mixed, entrained or otherwise—is transmitted from a hydrogen/nitrogen source 46 to the anode side 24 of the fuel cell stack 20 via a fluid injector 47 coupled to a (first) fluid intake conduit or hose 48. Anode exhaust exits the stack 20 via a (first) fluid exhaust conduit or manifold 50; the exhaust manifold 50 directs anode exhaust to a collection sump 78. A central active region of the anode bipolar plate 40 that confronts the proton-conductive membrane 28 may be fabricated with a working face (not visible) having an anode flow field with serpentine flow channels for distributing hydrogen over an opposing face of the membrane 28. A compressor or pump or other pneumatic supply 52 provides cathode inlet flow, e.g., of ambient air, deionized water (DI $H_2O$), and/or concentrated gaseous oxygen ($O_2$), via a (second) fluid intake conduit or hose 54 to the cathode side 26 of the stack 20. Cathode exhaust is expelled from the stack 20 via a (second) fluid exhaust conduit or manifold 56. A hydrogen bleed valve 49 selectively bleeds or otherwise redirects hydrogen flow from the anode's fluid intake conduit 48 to the cathode inlet (e.g., via fluid intake conduit 54), as discussed in more detail below. In the same vein, an oxygen bypass valve 53 selectively bypasses or otherwise redirects air to one or both of the exhaust manifolds 50, 56 so as to dilute outlet hydrogen concentration.

Programmable electronic control unit (ECU) 72 helps to control operation of the fuel cell system 14. As an example, ECU 72 receives one or more temperature signals T1 from a fluid temperature sensor that indicate a temperature of a coolant fluid; ECU 72 may responsively issue one or more command signals C1 to modulate system operation. This ECU 72 may also receive one or more temperature signals T2 from a stack temperature sensor that indicates, for example, operating and non-operating temperatures of the stack 20; ECU 72 may responsively issue one or more command signals C2 to modulate operation of the stack 20 (e.g., to generate increased waste heat). The ECU 72 may also receive one or more fuel cell voltage signals from voltage/current sensor 70; responsive to these signals, the ECU 72 may issue one or more command signals C3 to modulate current and voltage flow across the fuel cell stack 20. Additional sensor signals $S_N$ may be received by, and additional control commands $C_N$ may be issued from the ECU 72, e.g., to control any other sub-system or component of the vehicle 10. In FIG. 1, the arrows originating from or terminating at ECU 72 are emblematic of electronic signals or other communication exchanges by which data and/or control commands are transmitted from one component to the other.

Vehicle ECU 72 of FIG. 1 incorporates a battery management subsystem employing battery state estimation techniques using one or more reference electrodes (FIG. 2) to measure a voltage and/or current of the cathode (or anode) half-cell. Direct measurement of the half-cell voltage helps to enhance fast-charge capabilities, e.g., by providing a clearer indication of conditions where lithium plating can initiate. In this regard, the vehicle 10 is shown stock equipped with an electric storage unit, portrayed in the drawings as a longitudinally mounted traction battery pack 82. According to the representative configuration, the traction battery pack 82 is generally composed of an array of lithium-ion battery modules 84 arranged in a pattern of rows and columns, and a battery support tray 86 that provides subjacent support for the battery modules 84. Aspects of the disclosed concepts may be similarly applicable to other electric storage unit architectures, including those employing nickel metal hydride (NiMH) batteries, lead acid batteries, lithium polymer batteries, or other applicable type of rechargeable electric vehicle batteries (EVB). Battery pack 82 may optionally be composed of greater or fewer battery modules 84 that may be arranged in similar or alternative patterns from that which are shown in the drawings. Each of the illustrated battery modules 84 may include a series of pouch/prismatic battery cells, such as prismatic lithium ion (Li-ion) or Li-ion polymer battery cells and nickel-metal hydride (NiMH) battery cells, for example. For simplification of design and maintenance, and for reduction in cost, each module 84 may be approximately the same size or otherwise substantially identical.

Figure 2:
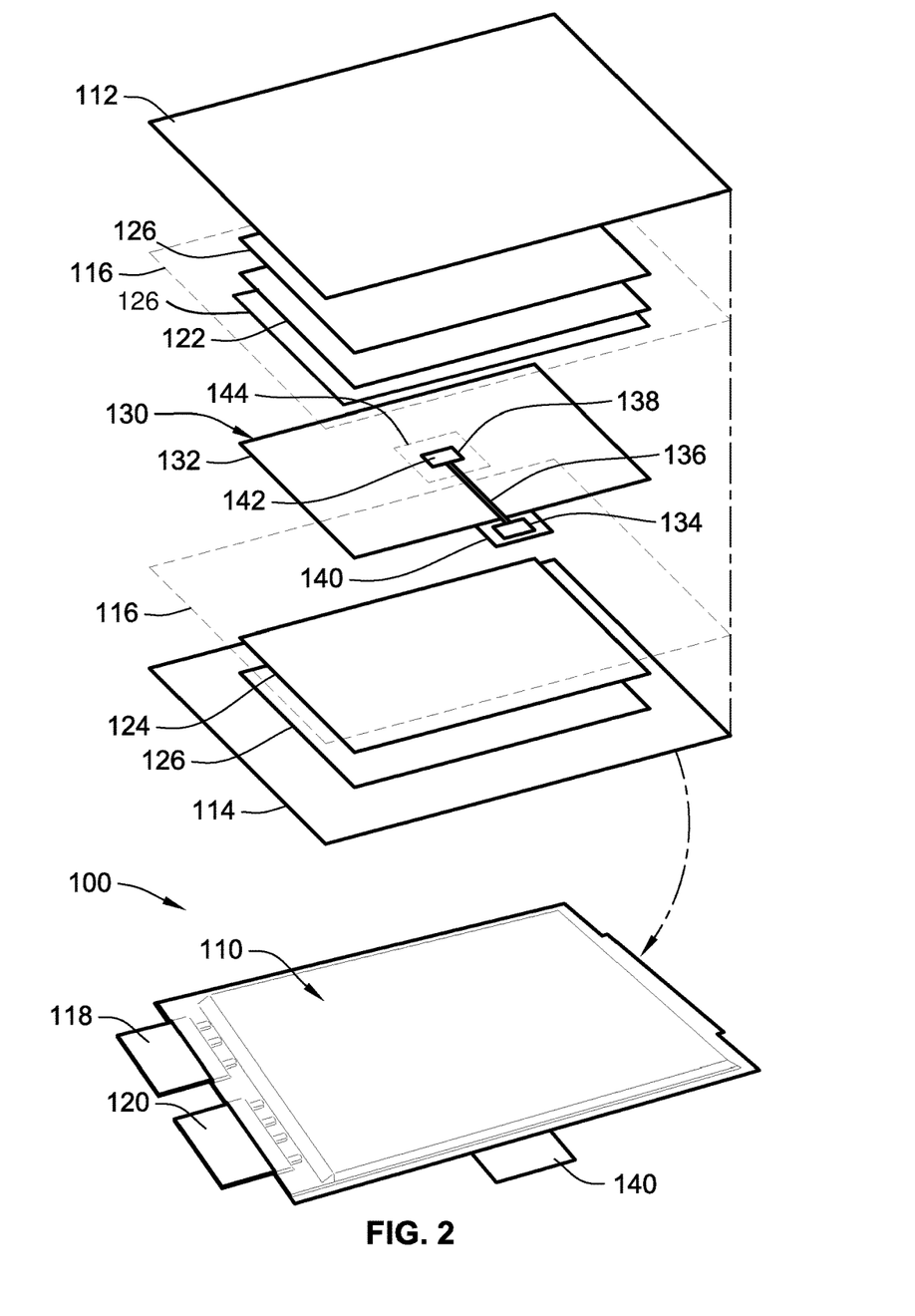
FIG. 2 is a partially exploded, perspective-view illustration of a representative battery cell assembly with a reference electrode in accordance with aspects of the present disclosure.

An individual lithium-ion battery module 84 may be typified by a single rechargeable battery cell assembly, an example of which is designated generally 100 in FIG. 2, or multiple battery cell assemblies 100 (e.g., 20-30) that are stacked and connected in parallel or series for storing and supplying electrical energy. As shown, each battery cell assembly 100 is a multi-layer construction that is provided with an outer battery housing, which is represented in the drawings by an envelope-like pouch 110 with two generally flat, rectangular major facing sides 112 and 114. The respective sides 112, 114 of the pouch 110 may be formed of aluminum sheet or foil or other suitable material, both sides of which may be coated with a polymeric material that insulates the metal from the cell elements and from any adjacent cells. These two sides 112, 114 are connected, e.g., via welding or crimping or other appropriate joining technique, to generally enclose therein a liquid electrolyte composition (shown schematically at 116) that conducts positive Lithium ions between working and reference electrodes. Extending outwardly from longitudinal edges of the two major sides 112, 114 of pouch 110 are negative and positive tabs 118 and 120, respectively, for making electrical connections with negative and positive electrodes of an electrode assembly (discussed below) fitted within the internal volume of pouch 110. While shown as a silicon-based, Li-ion "pouch cell" battery, the battery cell assemblies 100 may be adapted to other constructions, including cylindrical and prismatic constructions.

Pouch 110 is shaped and sized to store therein a single unit or a stack of repeated units of lithium-ion cell components, with a single unit generally composed of a first working (anode) electrode 122 layer, a second working (cathode) electrode 124 layer, and a series of separator sheets 126 interleaved between the anode layer 122, cathode layer 124, and the major sides 112, 114 of pouch 110. Although FIG. 2 illustrates only one unit of cell components inserted within the pouch 110, it should be appreciated that the pouch 110 may stow therein a sandwiched stack of multiple cell component units (e.g., five to fifteen units). The anode electrode 122 and cathode electrode 124 are operatively attached to the pouch 110, and placed in electrochemical contact with the electrolyte composition 116 such that ions are transferable therebetween. Reference to the first working electrode 122 as an "anode" or "anode electrode" or "positive electrode" is not intended to limit the first working electrode 122 to a particular polarity as the designation of a particular electrode as anode or cathode may change depending on how the battery cell assembly 100 is being operated (e.g., whether the process is oxidation or reduction). In the same vein, any reference to the second working electrode 124 as a "cathode" or "cathode electrode" or "negative electrode" should not be construed as limiting the second working electrode 124 to a particular polarity or functionality.

With continuing reference to FIG. 2, anode electrode 122 may be fabricated from a material that is capable of incorporating lithium ions during a battery charging operation, and releasing lithium ions during a battery discharging operation. Exemplary anode electrode 122 materials suitable for this function may include, but are not limited to, carbon materials (e.g., graphite, coke, soft carbons, and hard carbons) and metals (e.g., Si, Al, Sn, and/or alloys thereof). In this regard, the cathode electrode 124 is fabricated from a material that is capable of supplying lithium ions during a battery charging operation, and incorporating lithium ions during a battery discharging operation. The cathode 240 material may include, for instance, a lithium metal oxide, phosphate, or silicate, such as $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). It may be desirable that the anode electrode 122 and cathode electrode 124 be fabricated from materials that exhibit a long cycle life and calendar life, and do not experience significant resistance increase throughout the life of the battery. Separators sheets 126 may each be composed of a porous polyolefin membrane, e.g., with a porosity of about 35% to 65%, and a thickness of approximately 25-30 microns. These separator sheets 126 may be modified, for instance, by the addition of electrically non-conductive ceramic particles (e.g., silica) that are coated on the porous membrane surfaces.

Inserted into the pouch 110 is a separator-sheet-supported reference electrode assembly 130, which is interposed between the anode electrode 122 and the cathode electrode 124, placed in electrochemical contact with the electrolyte composition 116. Locating the reference electrode assembly 130 between the anode electrode 122 and cathode electrode 124 helps to minimize or otherwise avoid electrical edge effects. For at least some embodiments, the reference electrode assembly 130 (also referred to herein as "reference electrode" for simplicity) functions as a third electrode that independently measures voltage of the cathode electrode 124 and anode electrode 122. Moreover, the reference electrode assembly 130 may maintain a minimal thickness (e.g., approximately 20-30 microns) to cause minimal perturbation of the cell's voltage profile. This reference electrode assembly 130 of FIG. 2 is fabricated with a separator sheet 132 that supports thereon an electrical contact 134, an electrical track 136 and an electrical lead 138. This dedicated separator sheet 132 is fabricated from an electrically insulating, porous polymeric material, such as polyethylene (PE) or polypropylene (PP) or a combination of both. Thin porous separator sheet 132 may be interposed in face-to-face non-contacting relation between parallel faces of anode and cathode layers 122, 124, with the lithium ion-containing, liquid electrolyte solution 116 permeating and filling the pores and contacting the surfaces of the sheet 132. An optional jacket separator (not shown) may be disposed across and cover one or both sides of the separator sheet 132, e.g., to help ensure no direct physical contact with the positive and negative electrodes 122, 124.

The electrical contact 134, electrical track 136, and electrical lead 138 may be fabricated using any suitable method (e.g., etching, sputtering, inkjet, thin-film deposition, etc.) and from any appropriate electrically conductive material, such as gold, copper, silver, nickel, stainless steel, silver, carbon cloth, and conductive materials that are stable with respect to the potential of the electrode, which may be mixed with a suitable polymeric binder material. When measuring voltage, the reference electrode's contact, lead and track 134, 136, 138 may be sufficiently small (e.g., approximately 1-4 mm or less wide, and approximately 25 nm or less thick) so as to only draw an insignificant amount of current and to help ensure a minimal effect on the mating of the cell layers. The reference electrode assembly 130 may also be fabricated with an optimal porosity, e.g., approximately equal to a porosity of a pristine separator, that will not impede ion flux between the positive and negative electrodes 122, 124. In accord with the illustrated example, a support tab 140 projects transversely from a lateral edge of the elongated separator sheet 132; the electrical contact 134 is deposited on or otherwise affixed to the support tab 140. The electrical track 136 electrically connects the electrical lead 138 to the electrical contact 134. As shown, the electrical track 136 has opposing first and second track ends; the first track end adjoins the electrical contact 134 while the second track end adjoins the electrical lead 138 in what is shown as an I-shaped pattern. It should be appreciated that the reference electrode 130 may take on other patterns and may include more than one lead, track and/or contact. By way of non-limiting example, the reference electrode assembly 130 may be fabricated with an E-shaped electrical track that connects three discretely placed leads to a single contact.

Continuing with the representative configuration illustrated in FIG. 2, the reference electrode assembly 130 is also fabricated with an intercalation electrode 142 that is deposited on the support sheet 132 and attached to the electrical lead 138. Acting as an active electrode material with added thermal stability and low hysteresis, the intercalation electrode 142 may be fabricated from a material including iron(III) phosphate ($FePO_4$) or lithium iron phosphate ($LiFePO_4$), including both crystalline and amorphous forms as well as hydrates and combinations of these compounds. For at least some desired applications, the electrical lead 138 is sandwiched between the intercalation electrode 142 and the separator sheet 132. Optionally, the intercalation electrode 142 may be deposited on and cover the electrical lead 138. In the illustrated assembly configuration, electrically non-conductive particles may be deposited to create a very thin alumina layer 144 that is deposited on and covers the intercalation electrode 142 and, consequently, the electrical track 136. This alumina layer 144, which may be only a few atoms thick, helps to stabilize the reference electrode assembly 130 e.g., for a longer life.

In a multilayer stack in which the battery cell assembly 100 is provided with several layers of lithium-ion cell components (e.g., 16 total layers in a single battery cell assembly), a plurality of the reference electrode assemblies 130 can be inserted at several positions throughout the stack, e.g., for redundancy. In such an instance, the support tabs 140 for the various reference electrode assemblies 130 can be interconnected for a single readout, as it may be expected that they all have the same (or nearly the same) voltage. Additionally, by providing multiple, independently operating reference electrodes, if one reference connection fails, the signal will likely remain valid with the remaining reference connection(s). Another optional configuration may incorporate multiple reference connections—two or more electrical leads—on a single separator sheet 132; doing so would provide averaging for variance across the plane of the cell. If so desired, a single battery cell assembly 100 with multiple, independent (non-connected) reference electrode assemblies 130 could help to provide information about non-uniform electrode utilization, and provide redundancy in case one or more reference electrodes shorts out or otherwise fails to provide the desired signal. The placement of tabs (pos., neg., & ref.) around the cell can be varied as convenient for packaging, etc.

Disclosed battery management system (BMS) designs utilizing a battery cell assembly 100 with one or more reference electrode assemblies 130 in any of the manners described above may offer direct measurement of half-cell voltage, which helps to enhance fast-charge capabilities. For instance, the reference electrode 130 and the cathode electrode 124 cooperate to output a half-cell voltage signal that is indicative of a battery state of the battery cell assembly 100. The term "battery state", as used herein, may refer to the battery's state of charge, state of power, state of life (e.g., battery resistance and/or total capacity), as well as other parameters in a battery model that can be regressed. Two available techniques for estimating the state of charge of a battery include: (1) coulomb counting (integrate current); and (2) voltage lookup. For coulomb counting, the state of charge (SOC) may be determined as:

$$SOC = SOC(t_0) + \frac{1}{Cap} \int_{t_0}^{t_1} I(t)\,dt$$

where $SOC(t_0)$ is an initial state of charge value (typically SOC=100% after a full charge). Errors in measuring current, $I(t)$, may lead to an accumulation of error in SOC (e.g., more error may accumulate the longer the time period since a last full charge and the larger the number of partial charges). Uncertainty in the battery capacity (Cap) may also lead to an error as capacity tends to degrade over the life of a battery.

Estimating SOC using a voltage lookup technique may rely on the fact that, when a battery is fully rested, the battery's equilibrium voltage—more commonly referred to as "open-circuit voltage" or "OCV"—uniquely indicates the state of charge. As such, available mapping techniques may be used in a test setting to generate lookup tables with data that associates a range of open-circuit voltages with corresponding estimated battery charge values for a given battery configuration. An advantage of voltage lookup techniques is that full battery charging is not required and, thus, the technique works at any SOC. When the battery is in use, for example, a model of the battery's transient behavior estimates OCV and hence SOC. Transient models also help to predict the battery's available power (or SOP). It may be desirable, for at least some applications, that the disclosed battery state estimation techniques combine coulomb counting with voltage lookup to ensure the most accurate estimate of SOC. For instance, BSE may simultaneously estimate changes with age in Cap, OCV curve, and other parameters.

For purposes of battery state estimation within a BMS, it may be happen that one half-cell voltage has an OCV curve with low hysteresis whereas the other half-cell voltage has significant hysteresis. In particular, an anode (negative) electrode containing silicon (as a silicon alloy, silicon-oxide mixture, or other composition) may exhibit hysteresis in the negative-to-reference half-cell while the cathode (positive) electrode and hence the positive-to-reference half-cell exhibits low hysteresis. As such, voltage-based BSE may be utilized to provide the SOC of the half-cell that exhibits low hysteresis, which suffices to determine the full-cell SOC. Recognizably, the half-cell having low hysteresis may still have transient behavior (e.g., diffusion, etc.) such that battery state estimation using a transient model is likely needed. Any presently available or hereinafter devised BSE algorithm may be applied, based on a transient model such as a Voigt circuit model with an open-circuit voltage source in series with one or more resistor-capacitor (RC) pairs, or any of various models using ordinary differential equations or partial differential equations to approximate the physical processes occurring in the battery, or a Kalman-filtering or recursive least-squares estimation model. If the reference electrode is not functioning ideally, as explained below, the voltage signal may contain some "crosstalk" from a hysteretic negative; in such as case, a hysteresis model may be used with Kalman filtering applied to both output signals (cathode-to-reference and anode-to-reference), e.g., to disambiguate and provide a more accurate state estimate. While many of the novel aspects and features of this disclosure have been illustrated for a battery having a hysteretic negative half-cell and a positive half-cell exhibiting low hysteresis, these roles may be reversed should the positive half-cell have significant hysteresis while the negative electrode does not.

Lithium plating has been shown to degrade a battery over time, which is oftentimes driven by conditions at the anode's interface to the electrolyte. By measuring potential within the electrolyte composition, as described above, the reference electrode 130 may reveal when the Li-plating is incipient. Certain operating conditions may deem it necessary to avoid the plating; in such instances, BSE signals indicate to the BMS to limit current.

Over time, the lithium content of a reference electrode may need to be refreshed because voltage measurements must draw a small, but nonzero current. Reference reset may be completed whenever a battery cell has been fully charged by constant-voltage charging, e.g., via the reference electrode. The reference is relatively small, so this type of recharging likely requires only an insignificant cathode-to-reference current. A reset circuit may be added to the BMS for this purpose. It is possible that the reference may be reset relative to a fully charged anode potential, and the lithium exchange may take place between the anode and reference; the transfer may also happen between cathode and reference, controlled by a measured potential difference between anode and reference. In other words, the reference can be reset when either the cathode or the anode reaches a "landmark" potential, i.e., a potential that is the same with every charge completion over the life of the battery.

Figure 3:
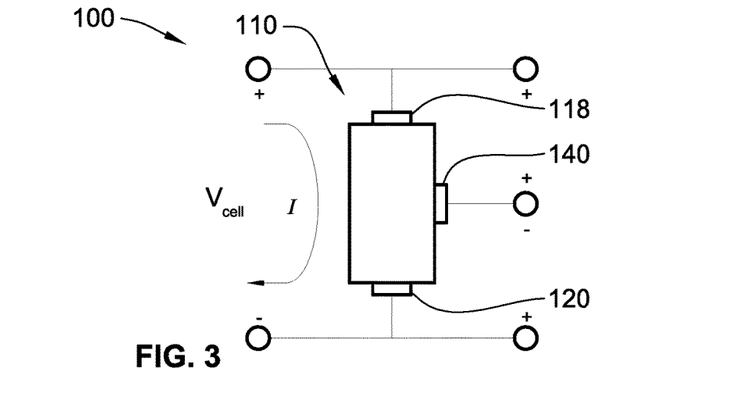
FIG. 3 is a schematic one-line diagram of select segments of the representative battery cell assembly of FIG. 2.

Turning next to FIG. 3, there is shown a schematic diagram of select segments of the representative battery cell assembly 100 of FIG. 2 to help demonstrate a method of estimating battery state under an "ideal" reference scenario. For a three-electrode battery cell assembly 100, two voltage signals may be provided: a first voltage signal $v_1$ and a second voltage signal $v_2$. If the reference is "ideal", then $v_1 = V_{PR}$ (the positive-to-reference voltage, which may be equal to the cathode half-cell voltage), and $v_2 = V_{NR}$ (the negative-to-reference voltage, which may be equal to the anode half-cell voltage). In this example, two voltages are measured: (1) $V_{PR} = V_{POSITIVE} - V_{REFERENCE}$; and (2) $V_{CELL} = V_{POSITIVE} - V_{NEGATIVE}$. With these two measurements, $V_{NR} = V_{NEGATIVE} - V_{REFERENCE}$ is then deducible as $V_{NR} = V_{PR} - V_{CELL}$; as such, $V_{NR}$ does not need to be measured separately. If the $V_{PR}$ signal is sufficiently close to "ideal", then the signal is likely showing a nearly zero hysteresis, and BSE may rely on that voltage signal. Even so, $V_{CELL}$ may be monitored as an independent check and as a factor in determining, for example, when a battery cell is fully recharged and when to reset the reference. When the $V_{PR}$ is not sufficiently close to ideal, both signals can be used in a Kalman filter estimation scheme as detailed below in the discussion of FIG. 4.

In general, an "ideal" reference scenario for BSE may be typified as a reference electrode configuration that does not disturb the distribution of current around it, such that the electrode measures the voltage that would otherwise exist at that site without the reference electrode in place. In practice, however, this "ideal" reference state is not always achievable in a physical device, as the electrode will oftentimes respond to conditions at other nearby sites. Since the reference electrode 130 of FIG. 2 is located between the positive and negative electrodes 122, 124, for example, the reference electrode 130 may be influenced by both and, in particular, may exhibit some hysteresis deriving from the negative electrode 124. Typically, only minimal hysteresis is observed when testing the positive electrode 122 separately against a lithium counter-electrode in a half-cell analysis; thus, an ideal reference would produce the same or substantially the same hysteresis-free $V_{PR}$ signal as would be seen from a positive half-cell driven by the same current profile as the full cell.

In a "non-ideal" reference electrode scenario, battery state estimation may be accomplished as follows: let $Z_P$, $Z_N$, $Z_1$, and $Z_2$ be impedances, and let P indicate the positive electrode, N indicate the negative electrode, R indicate the reference electrode, and S indicate the separator sheet. While the true cathode half-cell impedance is $Z_P$, it may not be possible to acquire a perfect measurement of the cathode half-cell impedance. Similar to the ideal scenario explicated above, in the non-ideal scenario two voltages are measured: $V_{PR}$ and $V_{NR}$; and the impedance response of $V_{PR}$ to current I is:

$$\mathcal{F}\left(\frac{V_{PR}}{I}\right) = \frac{Z_1(Z_P + Z_N)}{Z_1 + Z_2 + Z_P + Z_N}$$

For at least some ideal circumstances, $Z_1$ and $Z_2$ are proportional to $Z_P$ and $Z_N$, respectively, with the same proportionality constant $\lambda$ (i.e., $Z_1 = \lambda Z_P$, $Z_2 = \lambda Z_N$ so:

$$\mathcal{F}\left(\frac{V_{PR}}{I}\right) = \frac{\lambda}{1+\lambda} Z_P, \text{ and } \lambda \gg 1, \text{ so } \mathcal{F}\left(\frac{V_{PR}}{I}\right) \approx Z_P$$

More generally, some "crosstalk" is expected, say:

$$\begin{bmatrix} Z_1 \\ Z_2 \end{bmatrix} = \begin{bmatrix} a & b \\ c & d \end{bmatrix} \begin{bmatrix} Z_P \\ Z_N \end{bmatrix}$$

where a, b, c, d may depend on frequency. If the crosstalk coefficients are determined, the system will uniquely solve for $Z_P$ and $Z_N$ given $\mathcal{F}(V_{PR}/I)$ and $\mathcal{F}(V_{NR}/I)$, i.e., discern the state of both half-cells from observing the two non-ideal electrode voltages.

To deal with crosstalk, it has been determined that a cathode electrode has a relatively small hysteresis as compared to an anode electrode. As the battery cycles, a correction factor α can be determined to minimize the hysteresis in the signal v given:

$$v = V_{PR} + \alpha V_{NR}$$

This correction factor α can be calibrated off-line, for example, in a laboratory test, and updated for aging using data collected while the battery is in use. The minimally hysteretic signal v may be used in the cathode half-cell OCV voltage look-up table to correct the SOC values. More generally, models of the two half-cells may be used in an extended Kalman filter (EKF) or one of its variants (UKF, particle filter, etc.) with one current input and two voltage measurements as the BSE.

Figure 4:
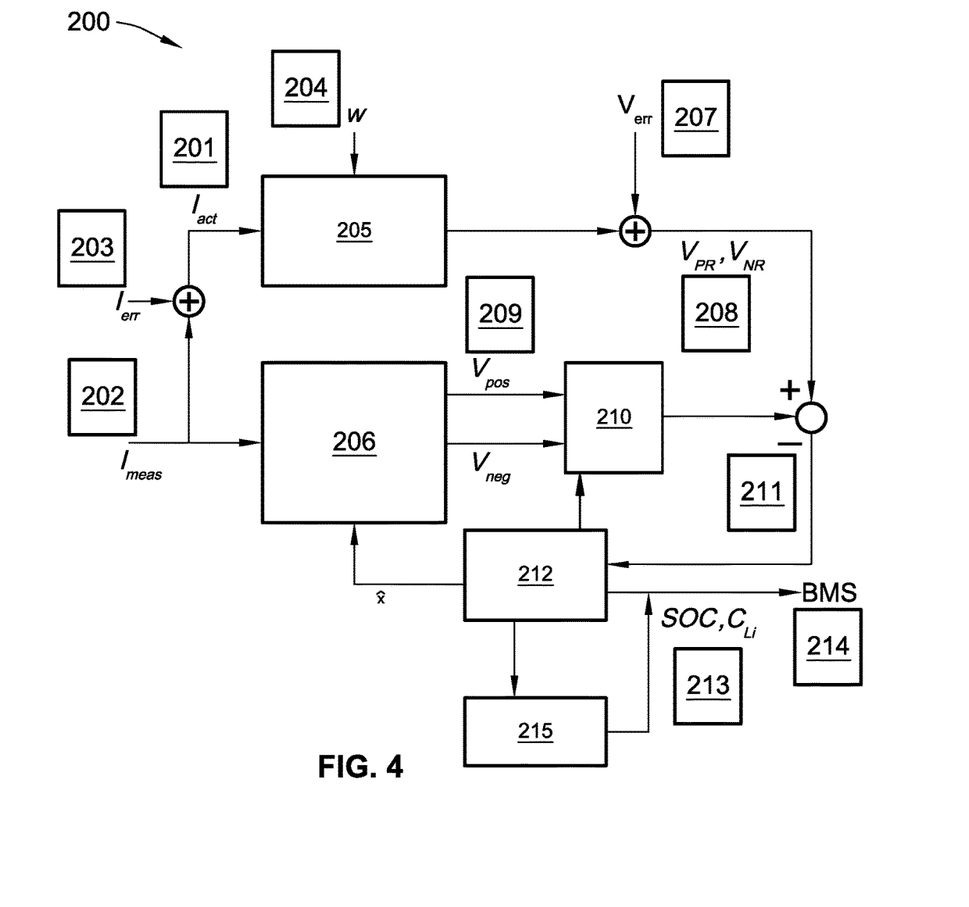
FIG. 4 is a schematic diagram of a representative battery state estimation control architecture for estimating a battery state of a battery cell assembly in accordance with aspects of the present disclosure.

Turning next to FIG. 4, a method 200 is presented for estimating a battery state of a battery cell assembly, for example, using half-cell models to predict $V_{pos}$, $V_{neg}$ from a state estimate $\hat{x}$ and a measured current $I_{meas}$. At operation block 201, a "real" or "actual" battery cell assembly 205 receives an actual current $I_{act}$, and a cell model 206 of the battery is simulated with $I_{meas}$ (a measurement of $I_{act}$) at operation block 202. These two values differ by an unknown measurement error $I_{err}$ that, while likely small, cannot be expected to be zero, and thus is accounted for at operation block 203. Process noise w, which is shown received or otherwise determined at operation block 204, may be designated as the sum total of all phenomena not included in the cell model 206, i.e., the factors that may make an actual voltage of the real battery differ from a model voltage. Actual battery cell 205 may be representative of a battery in a vehicle, including a traction battery pack 82, a calibrated subset of the battery modules 84 in the traction battery pack 82, and/or one, some or all of the battery cell assemblies 100 in a given battery module 84, as well as battery cells in non-automotive applications.

Cell model 206 of FIG. 4 may be inclusive of, but not exclusive to, a set of mathematical equations for modeling battery behavior, including calibrated differential equations that are representative of the internal state of the battery, and algebraic equations that help to represent how voltage depends on the state. In a specific example, the cell model 206 helps to predict a total cell terminal voltage $V_{CELL}$ and half-cell voltages, $V_{pos}$ and $V_{neg}$, relative to a reference electrode. An unknown error $V_{err}$ in measuring the voltages $V_{PR}$ and $V_{NR}$ is received or otherwise determined at operation block 207. The method 200 continues to operation block 208, where $V_{PR}$ and $V_{NR}$—the actual measurements of voltage from the positive electrode to the reference electrode and from the negative electrode to the reference electrode, respectively, are measured. As discussed above, these could be taken as $V_{PR}$ and $V_{CELL}$, with $V_{NR} = V_{PR} - V_{CELL}$. $V_{pos}$ and $V_{neg}$ are the predictions received from or otherwise determined by the cell model 206 for the two half-cell voltages at operation block 209.

Crosstalk model 210 helps to account for non-ideal behavior of the reference electrode, as discussed above. A simple crosstalk model 210 may include a linear model that produces two output voltages: $V_1 = a^*V_{pos} + b^*V_{neg}$, and $V_2 = c^*V_{pos} + d^*V_{neg}$, where a, b, c, d are constants. When a, b, c, d are properly adjusted, $V_1$, $V_2$ more accurately predict the actual measurements $V_{PR}$, $V_{NR}$. For at least some embodiments, if the reference electrode is determined to be "ideal", then a=1, d=1 and b=0, c=0. Optionally, experiments may be conducted with one or more representative reference electrodes to determine if a more dynamic crosstalk model is needed (e.g., a, b, c, d might be frequency dependent).

An internal state of the cell model 206 may evolve with time. If the internal state of the cell model 206 is an accurate match to a corresponding internal state of the actual battery 205, then any determined differences between $(V_1, V_2)$ and $(V_{PR}, V_{NR})$ may be solely due to noise (e.g., $I_{meas}$, $V_{err}$, w), and would likely vary randomly about a zero mean. To the extent that there are consistent differences, as determined at the (+/−) node 211, a Kalman filter 212 may apply a Kalman gain to the differences and adjust the state estimate to help decrease these differences. Doing so helps to bring the estimated state closer to the actual state. For at least some implementations, the system will be nonlinear; as such, Kalman filter 212 appeals to one or more nonlinear forms of Kalman, such as an Extended Kalman Filter (EKF) or an Unscented Kalman Filter (UKF) or their relatives. More generally, the Kalman filter 212 may be labelled simply as "Observer Law" with the various Kalman filter examples and generalizations described above as available options.

If the constants a, b, c, d in the crosstalk model 210 are determined to be part of the battery state, the Kalman filter 212 may adjust the constants a, b, c, d based on a comparison of $(V_1, V_2)$ to $(V_{PR}, V_{NR})$. The adjusted constants may be fed back into the crosstalk model 210 from the Kalman filter 212. At operation block 213, an estimated state of the battery, such as State of Charge, SOC, is generated. This determined SOC value is then transmitted to a Battery Management System (BMS) 214, e.g., to indicate the amount of energy that is presently stored in a battery. In addition, a second state, such as a concentration of lithium at the surface of the negative electrode, $c_{Li}$, or some proxy thereof, may also be sent to the BMS 214. BMS 214 may use any one or more of these values to control a current flow to the battery, e.g., to help avoid plating lithium on the negative electrode, a mode of battery degradation including capacity loss.

A full state estimate can be used by a State of Power (SOP) model 215 to predict a battery behavior in the near future, e.g., under certain extreme conditions. For instance, SOP model 215 can determine a voltage that will been seen if a maximum charge current or a maximum discharge current is applied to the battery. This determination helps to establish an amount of power that is available, e.g., over the next few seconds (typically the next 1 second, 2 seconds, and 30 seconds). It should be recognized that, if the system can predict voltage for a given current, the system can calculate power from that predicted voltage. The SOP model 215 may be similarly configured to the cell model 206, but instead of predicting a voltage output for a measured current, $I_{meas}$, the SOP model 215 predicts a voltage value for maximal currents. When the battery is at or near a voltage limit, the model may switch over to predict current as the voltage is held at a limit.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery cell assembly for storing and supplying electrical energy, the battery cell assembly comprising:
   a battery housing;
   an electrolyte composition stored within the battery housing and configured to conduct ions;
   a first working electrode operatively attached to the battery housing in electrochemical contact with the electrolyte composition;
   a second working electrode operatively attached to the battery housing in electrochemical contact with the electrolyte composition; and
   a reference electrode interposed between the first working electrode and the second working electrode in electrochemical contact with the electrolyte composition, wherein the reference electrode and the second working electrode cooperate to output a half-cell voltage signal indicative of a battery state of the battery cell assembly.

2. The battery cell assembly of claim 1, wherein the reference electrode includes an electrical contact attached to a separator sheet.

3. The battery cell assembly of claim 2, wherein the separator sheet is fabricated from an electrically insulating, porous material.

4. The battery cell assembly of claim 2, wherein the reference electrode further includes a tab projecting transversely from the separator sheet, the electrical contact being affixed to the tab.

5. The battery cell assembly of claim 2, wherein the reference electrode further includes an electrical lead and an electrical track, the electrical track electrically connecting the electrical lead to the electrical contact.

6. The battery cell assembly of claim 5, wherein the electrical track has opposing first and second track ends, the first track end adjoining the electrical contact, and the second track end adjoining the electrical lead.

7. The battery cell assembly of claim 5, wherein the electrical lead, the electrical track, and the electrical contact are fabricated from a material including gold, copper, nickel, stainless steel, carbon cloth, and/or silver.

8. The battery cell assembly of claim 5, wherein the reference electrode further includes an intercalation electrode attached to the electrical lead.

9. The battery cell assembly of claim 8, wherein the intercalation electrode is fabricated from a material including iron(III) phosphate ($FePO_4$) and/or lithium iron phosphate ($LiFePO_4$).

10. The battery cell assembly of claim 8, wherein the electrical lead, the electrical track, and the intercalation electrode are affixed to the separator sheet, wherein the electrical lead is sandwiched between the intercalation electrode and the separator sheet.

11. The battery cell assembly of claim 8, wherein the reference electrode further includes an alumina layer attached to the intercalation electrode.

12. The battery cell assembly of claim 11, wherein the electrical lead is deposited on the separator sheet, the intercalation electrode is deposited on and covers the electrical lead, the alumina layer is deposited on and covers the intercalation electrode, and a second separator sheet covers the electrical lead and the intercalation electrode.

13. The battery cell assembly of claim 1, wherein the battery housing includes a pouch with substantially planar top and bottom faces of flexible material, the pouch at least partially encasing therein the electrolyte composition, the first and second working electrodes, and the reference electrode.

14. An electric-drive vehicle, comprising:
   a vehicle body;
   a plurality of road wheels rotatably attached to the vehicle body;
   a traction motor attached to the vehicle body and configured to drive one or more of the road wheels;
   a traction battery pack attached to the vehicle body and electrically connected to the traction motor to transfer electric current therebetween, the traction battery pack including an array of battery cell assemblies, the battery cell assemblies each including:
      a battery housing;
      an electrolyte composition stored within the battery housing and configured to conduct ions;

a first working electrode stored within the battery housing in electrochemical contact with the electrolyte composition;

a second working electrode stored within the battery housing in electrochemical contact with the electrolyte composition; and a reference electrode interposed between the first and second working electrodes in electrochemical contact with the electrolyte composition; and a vehicle controller communicatively connected to the traction battery pack, the vehicle controller being operable: to receive a half-cell voltage signal from the reference electrode and one or both of the first and second working electrodes, and determine a battery state of at least one of the battery cell assemblies from the half-cell voltage signal.

15. A method of assembling a battery cell assembly for storing and supplying electrical energy, the method comprising:

receiving a battery housing;

disposing an electrolyte composition within the battery housing, the electrolyte composition being configured to conduct ions;

operatively attaching a first working electrode to the battery housing in electrochemical contact with the electrolyte composition;

operatively attaching a second working electrode to the battery housing in electrochemical contact with the electrolyte composition; and positioning a reference electrode between the first working electrode and the second working electrode such that the reference electrode is in electrochemical contact with the electrolyte composition, wherein the reference electrode and the second working electrode cooperate to output a half-cell voltage signal indicative of a battery state of the battery cell assembly.

16. The method of claim 15, wherein the reference electrode includes an electrical contact, an electrical lead, and an electrical track, the electrical track electrically connecting the electrical lead to the electrical contact, the electrical lead, the electrical track, and the electrical contact all being attached to an electrically insulating separator sheet.

17. The method of claim 16, wherein the reference electrode further includes an intercalation electrode attached to the electrical lead.

18. The method of claim 17, wherein the electrical lead, the electrical track, and the electrical contact are fabricated from a first material including gold, copper, stainless steel, nickel, carbon cloth, and/or silver, and wherein the intercalation electrode is fabricated from a second material including iron(III) phosphate ($FePO_4$) and/or lithium iron phosphate ($LiFePO_4$).

19. The method of claim 17, wherein the reference electrode further includes an alumina layer attached to the intercalation electrode.

20. The method of claim 15, wherein the battery housing includes a pouch with substantially planar top and bottom faces of flexible material, the pouch at least partially encasing therein the electrolyte composition, the first and second working electrodes, and the reference electrode.

* * * * *